April 30, 1968 — L. T. STAATS, JR — 3,380,513

HEAT EXCHANGE ARRANGEMENT

Filed Sept. 26, 1966 — 2 Sheets-Sheet 1

INVENTOR
LOUIS THOMPSON STAATS, JR.

BY *Harry E. Braddock*

ATTORNEY

April 30, 1968

L. T. STAATS, JR 3,380,513

HEAT EXCHANGE ARRANGEMENT

Filed Sept. 26, 1966

INVENTOR
LOUIS THOMPSON STAATS, JR.

BY

ATTORNEY

United States Patent Office 3,380,513
Patented Apr. 30, 1968

3,380,513
HEAT EXCHANGE ARRANGEMENT
Louis Thompson Staats, Jr., Lewisville, Pa., assignor to E. I. du Pont de Nemours and Company, Wilmington, Del., a corporation of Delaware
Filed Sept. 26, 1966, Ser. No. 581,985
6 Claims. (Cl. 165—1)

ABSTRACT OF THE DISCLOSURE

A heat exchange apparatus and process utilizing a housing with inlet and outlet means and a fluid displacing means mounted in the housing, the housing also containing at least one bundle of relatively small fluid-carrying flexible tubular elements secured in position at the ends of the bundle. The fluid displacing means and bundle of tubular elements are arranged in the housing so that when the housing contains a fluid and the fluid displacing means is actuated, the fluid and tubular elements are kept in substantially continuous lateral movement which is sufficient to prevent deposition and build-up on the tubular elements of solid material separated from the fluid.

---

This invention generally relates to the field of heat exchange. More specifically, it involves improved apparatus and methods for accomplishing effective heat exchange by means of at least one fluid in certain end use areas wherein crystallization, or other separation of solids from the fluid occurs during heat exchange.

Heat exchange units, especially crystallizers, comprising a chamber for holding a fluid containing material which is separated out as a solid during temperature change, heat exchange coils, and necessary inlet and outlet means are known in the art. However, where separation or crystallization of solid material from a fluid occurs in such an apparatus, a serious problem of the solid material collecting or caking on various parts of the apparatus occurs. Build-up of such material on heat exchange coils or tubes, for example, not only decreases heat exchange efficiency, but also could interfere with fluid flow patterns in the apparatus. Most apparatus of this type must either be operated on a batch basis, or must be frequently shut down to clear away and remove the collected solid material before the apparatus efficiency falls below a desired minimum.

It is an object of the invention to provide an improved heat exchange process and apparatus arrangement of this type which eliminates the disadvantages and problems encountered by the earlier prior art arrangements.

It is another object of the invention to provide such improved arrangements which are capable of continuous operation for long periods of time without the need for shutdown for cleaning and removal of solid matter from vital components thereof.

It is a further object of this invention to provide such an improved heat exchange arrangement which is simple and economical to manufacture and maintain, yet effective and reliable to operate.

The objects of the invention are achieved in a novel improved arrangement or combination, generally comprising steps and means for maintaining in a given zone, a fluid containing a material which is separated therefrom as a solid, maintaining a bundle of elongated flexible tubular elements at said terminal portions only, establishing a degree of tension in said elements between said terminal portions to permit a predetermined limited degree of movement of said elements between said terminal portions in said zone, and while passing a heat exchange medium through said elements, creating substantially continuous flow conditions in said fluid in said zone of sufficient velocity and extent to keep said elements in motion sufficient to prevent deposition and build-up of said solid material on said tubular elements.

Other objects and advantages will be apparent from a consideration of the following specifications and claims in conjunction with the accompanying drawings in which:

Figure 2:
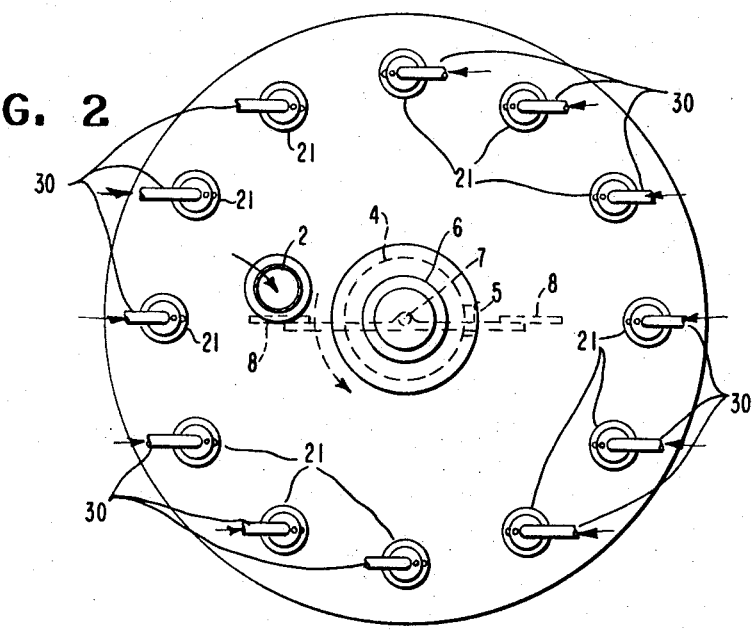
FIGURE 2 is a top or plane view of the apparatus of FIGURE 1.

A preferred embodiment of the invention is illustrated in the drawings. This apparatus as shown in FIGURES 1, 2, and 3 involves an end use application in the crystallization art although the principles of the invention are not limited thereto.

The apparatus of the invention as shown in the drawings comprises a fluid-tight housing or casing 1 which defines a zone for receiving a fluid containing the material to be separated therefrom as a solid. The housing 1 is provided with suitable inlet means 2, outlet means 3, and overflow means 5 positioned on vertical extension 4 of the housing 1. A drive motor 6 is mounted on the upper portion or extension 4 of the housing 1. The drive shaft (not shown) of the motor 6 is rigidly connected to vertically extending shaft 7 of an agitator assembly comprising agitator or fluid-displacing elements 8 mounted on radially extending members projecting from shaft 7. Shaft 7 is suitably supported at its lower end as shown in FIGURE 1 for rotation by the drive motor 6. A group of compact bundles 20 of a large number of relatively small flexible tubular cooling elements 22 are mounted in the zone defined by the housing 1 by means of securing means 21 which cooperates with the housing and the bundles as shown.

Figure 1:
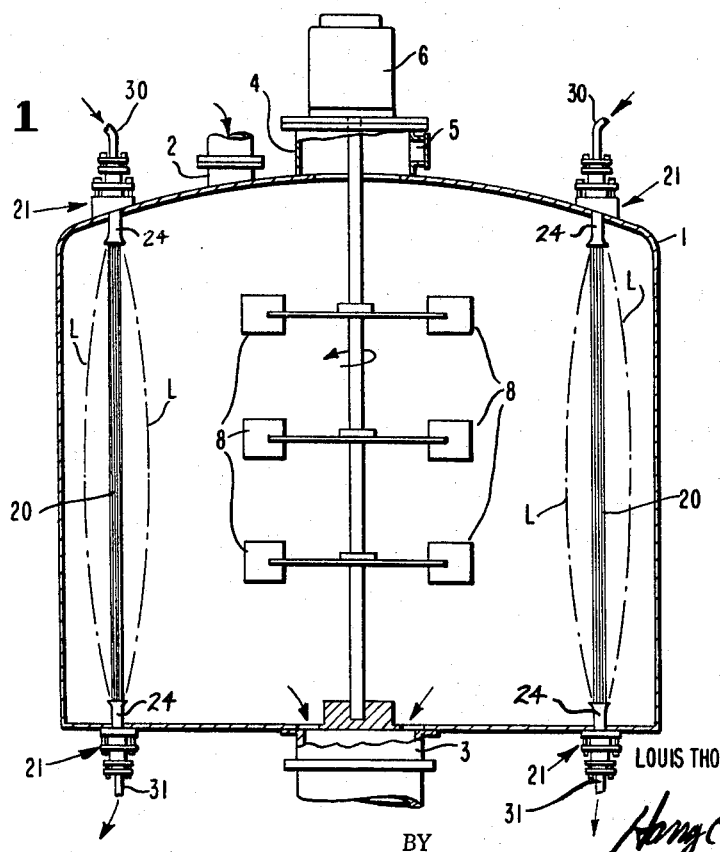
FIGURE 1 is a vertical longitudinal cross-sectional view of one embodiment of a heat exchange apparatus, of the crystallizer type, embodying features of this invention.

With a vertical agitator shaft arrangement as viewed in FIGURES 1 and 2, one preferred arrangement involves an annular disposition of the bundles at a given radial distance from the agitator assembly and substantially parallel thereto. As seen in FIGURE 2, each bundle is spaced a given distance from the nearest other bundles, a given distance from the agitator assembly and a given distance from the housing 1 along the length of the bundle. As will be described in detail hereinafter, the bundle securing means 21 also cooperates with the tubular elements of each bundle and conduits 30 and 31 to provide for a flow of a cooling medium through the hollow tubular elements 22 in the housing 1. The lengths of each bundle 20 and its tubular elements 22 are carefully controlled relative to the distance between the positions on the housing 1 to which the bundles 20 are secured (by the securing means 21) so that a predetermined amount of tension and limited lateral movement of the tubular elements of the bundle are achieved. Since the terminal portions of the tubular elements 22 and the bundle 20 are secured to the housing 1 by the securing means 21, the movement of the elements of the bundle can occur between these end portions within the limits generally indicated in FIGURE 1 by the curved lines L. This tension (which may vary from zero to some definite value) and the degree of this movement are controlled by the arrangement of the apparatus so that the tubular elements of each bundle do not engage the tubular elements of any other bundle, or the housing 1, or the agitator assembly, or any other structure of the apparatus (except the securing means at the terminal portions of the bundles) within the permitted range of movement.

Figure 3:
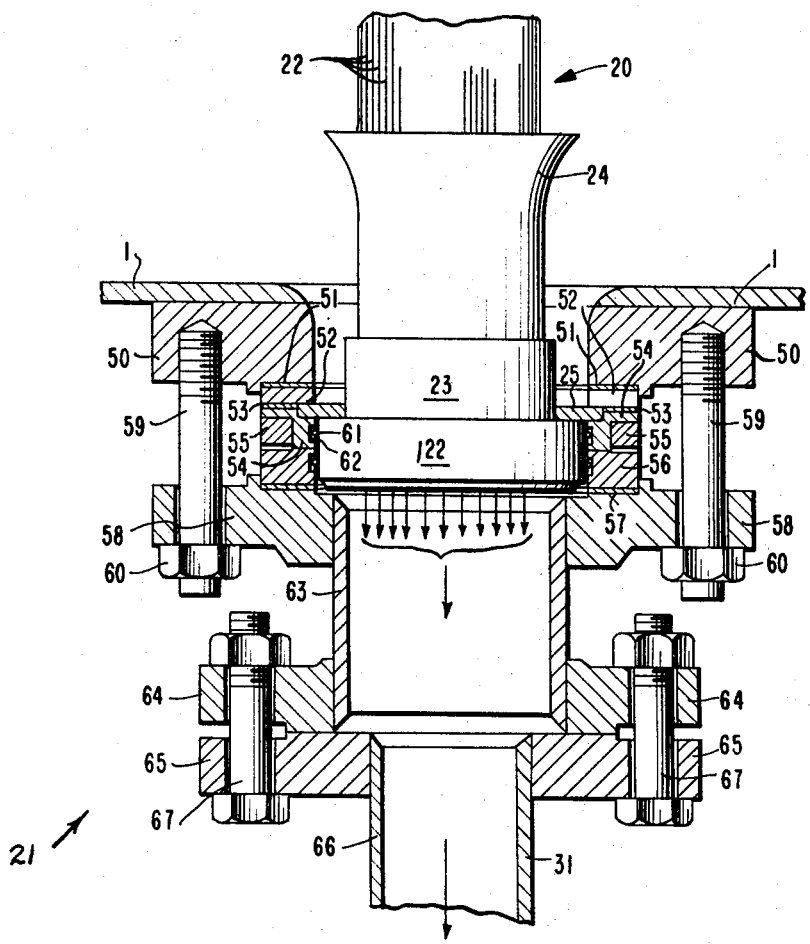
FIGURE 3 is an enlarged partial view of the means for securing a bundle of heat exchange tubes in the housing of the apparatus of FIGURE 1, certain parts being broken away to make a clearer showing.

The details of a bundle securing means 21 and its cooperation with housing 1, the tubular elements 22, and the conduits 30 and 31 appear in the enlarged showing of FIGURE 3. In the preferred embodiment of the apparatus shown in FIGURE 3, the terminal portions of the bundles 20 of tubular elements 22 comprise the terminal portions of the tubular elements and an annular member, preferably made of a polyfluorinated plastic material, which is provided with a first cylindrical portion 122 of a given diameter and a second cylindrical portion 23 of reduced diameter. The terminal portions of the tubular elements are contained within and surrounded by the annular member. In addition the exteriors of the tubular elements are sealed in fluid-tight relationship to each other and to the interior of the annular member with the open ends of each tubular element intersecting and in free communication with the lower surface of portion 122 of the annular member as viewed in FIGURE 3. A flared sleeve 24 surrounds each bundle 20 near its terminal portions, the flared sleeve being suitably secured to cylindrical portion 23 of the annular member at the end of the tube bundle. Flared tube 24 restrains tubular element movement near the ends of the bundle to prevent undue flexing or stressing of the tubular elements at these locations during operation of the apparatus.

The tubular elements are preferably formed of a suitable polyfluorinated plastic material and in sizes as disclosed in prior U.S. Patent No. 3,228,456 issued on Jan. 11, 1966. The terminal portions of the bundle and the sealing arrangement of the tubular elements within the annular member may be formed according to the principles disclosed in assignees prior copending patent application Ser. No. 425,507 filed Jan. 14, 1965, in the name of Michael S. Withers.

The securing means 21, which cooperate with the terminal portions of the tube bundles 20 and the housing, is the same at inlet (top) and outlet (bottom) terminal portions of the bundles and comprises a flat ring or boss element 50 secured by suitable means, such as welding to the housing means 1 and in position surrounding an opening through said housing means. A gasket element 51 engages boss element 50 and a positioning ring element 52. The terminal portion of a bundle of tubular elements 20 extends through the opening in the housing means and is surrounded by the gasket element 51, boss element 50, and the positioning ring 52 as seen in FIGURE 3. Element 25 is a split retaining ring which engages positioning ring 52 and the shoulder defined by the differing diameters of portions 23 and 122 of the annular member at the end of the bundle of the tubular elements. Split ring element 25 maintains the desired degree of tension on the bundle 20. The amount of tension is varied by varying the size or number of positioning rings 52. Two sealing elements 54 and 56, each provided with annular groove 61 and resilient seal ring 62, cooperate with portion 122 of the annular member at the end of the tube bundle to prevent flow of fluid between the tubular elements and space outside the apparatus. Backup ring 55 cooperates with sealing elements or rings 54 and 56 to complete the sealing arrangement. Sufficient radial clearance is provided between the exterior surface of cylindrical portion 122 and the surrounding sealing elements to accommodate thermal expansion of the annular element of the bundle without damage or over-stressing of the parts. A double flanged adapter assembly comprising flanged element 58, conduit section 63, and flange element 64 is secured by threaded stud bolts 59 and nuts 60 to boss element 50, with suitable gasket elements 57 and 53 provided as indicated between certain of the sealing elements to prevent leakage. The double flanged adapter assembly as shown collects fluid passing through the tubular elements of a bundle and conducts it to conduit 31 which is provided with flange 65 connected to the flange 64 of the adapter assembly by bolts 67. The securing means which supplies fluid into the tubular elements at the top of the apparatus as shown in FIGURE 1 is identical to the securing means which collects fluid from the tubular element bundle at the bottom of the apparatus, and for that reason is not shown or described in detail.

In operation as a crystallizing unit, the operation of the apparatus shown involves supplying a cooling medium through conduits 30 to the securing means 21 at the upper ends of each tube bundle 20. This cooling medium is directed through the interiors of the hollow tubular elements of each bundle to the securing means 21 at the lower end of each tube bundle from which it is removed by conduits 31. At the same time the mother liquor or solution containing dissolved material to be separated therefrom is supplied to the housing via inlet means 2. The general principle of operation is well-known, involving crystallization or separation of the dissolved material from the mother liquor as the temperature thereof is lowered. In continuous operation the slurry of crystals, or separated solid material, is removed from the housing means vie outlet 3 for further treatment, and an overflow stream may be handled by means of connection 5 at the upper portion of the housing 1. With the housing substantially filled and the cooling action of the tube bundles maintained, the rotation of the agitator assembly or fluid displacing means is commenced and continued at a rate which is sufficient to cause fluid flow patterns in the housing means of an extent, velocity, and direction not only to keep the temperature conditions of the mother liquor as uniform as possible and increase the rate of heat transfer between the tubular elements and the mother liquor; but also to produce substantially continuous lateral movement of the tubular elements within the limits previously described. The continuous movement of the tubular elements is maintained at a level in velocity and extent which satisfactorily prevents deposition and build-up of the crystallizing material in the tubular elements. This movement of the tubular elements also enhances heat transfer and maintains optimum temperature gradients by preventing formation of layers of cooled liquid along the exterior surfaces of the tubular elements carrying the cooling medium.

With a liquid in the housing and tubular elements about 10 feet long with about 3 inches of slack, 0.1 inch in diameter, 0.01 inch in wall thickness, in bundles of several hundred each it was found that a liquid velocity of at least about one foot per second around the tubular elements, with a substantial component perpendicular to the tubes, was required to prevent undesirable deposition and build-up of the solid material on the tubular elements.

However, it is believed to be clear to those skilled in the art that variations in size of the tubular elements, dimensions of the apparatus, tension on the tubular elements, nature of the fluids and dissolved matter involved will vary the requirements of fluid flow sufficient to create the desired movement of the tubular elements. Selection of specific optimum conditions for the particular features or variables of a given arrangement in following the general principles of this invention are believed to be within the ability of those skilled in the art.

It is believed to be clear that an improved apparatus and process has been provided in accordance with the objects of the invention.

Although a single prepared embodiment has been described in accordance with the patent statute, it is believed that modifications and variations within the spirit of the invention will occur to those skilled in the art, and all such are intended to fall within the scope of the following claims.

What is claimed is:

1. An improved apparatus for accomplishing a heat exchange function involving at least one heat exchange fluid having therein a material which is separated out therefrom as a solid during the heat exchange function, said apparatus comprising in combination, a housing means defining a zone for receiving fluid containing a material which is separated therefrom as a solid, said housing means provided with inlet and outlet means, said apparatus further comprising a fluid displacing means cooperating with said housing means for operative association with a fluid contained in said zone, at least one bundle of relatively small flexible tubular elements positioned in said zone, each bundle comprising a plurality of said tubular elements, each said bundle having an elongated dimension, opposed terminal portions and a lateral dimension, bundle-securing means cooperating with the terminal portions of each bundle and said housing means to secure said terminal portions of each bundle in position relative to said housing means at spaced positions such that said bundle extends through said zone between said positions and is maintained generally in a given location in said zone engaged and supported solely at its terminal portions, the length of each said bundle selected and determined relative to the distance between said spaced positions and said bundle-securing means cooperating with said bundle to maintain a predetermined amount of tension on said bundle such that a predetermined limited amount of lateral movement of said bundle between said terminal portions is permitted within said zone and relative to said housing means, said fluid displacing means and said bundle constructed and arranged to cooperate with each other and a fluid in said zone to produce substantially continuous lateral movement of said bundle in said zone between said terminal portions sufficient in velocity and extent to prevent deposition and build-up on said tubular elements of solid material separated from a fluid in said zone, said apparatus further comprising conduit means cooperating with said bundle securing means and said tubular elements of each bundle for supplying a heat exchange fluid through the interiors of said tubular elements, said tubular elements being formed of an organic polymeric composition and said continuous movement of said bundle being limited in extent to avoid engagement of said tubular elements between terminal portions of each said bundle with other structure of said apparatus.

2. The improved apparatus of claim 1 in which said tubular elements are compactly arranged in said bundle, are substantially of the same length, and are substantially parallel, and said bundle-securing means cooperates with said housing means and each said bundle to maintain said bundle under a given degree of tension to maintain said bundle substantially in a straight line configuration between said spaced positions of said housing when said fluid displacing means is in inoperative condition.

3. The improved apparatus of claim 1 in which said bundle-securing means comprises an adjustable means cooperating with said housing means and said bundle to vary the tension in said bundle and vary the limits of bundle movement.

4. The improved apparatus of claim 1 in which said bundle comprises a large number of tubular elements formed of a polyfluorinated plastic material with a size between about 5 and about 500 mils outside diameter with a wall thickness between about 0.5 and about 30 mils.

5. The improved apparatus of claim 4 in which said fluid displacing means is of sufficient power and capacity to provide a fluid velocity of at least one foot per second in the vicinity of said bundle with a substantial component of said velocity being substantially perpendicular to the elongated dimension of said bundle.

6. An improved process for accomplishing a heat exchange function involving at least one heat exchange fluid having therein a material which is separated out therefrom during the heat exchange function, and said process comprising in combination; maintaining in a given zone a fluid containing a material which is separated therefrom as a solid, maintaining at least one compact bundle of relatively small elongated flexible tubular elements formed of an organic polymeric composition, having opposed terminal portions and extending through said zone, by supporting said elements at said terminal portions only, establishing a degree of tension in said elements between said terminal portions to permit a predetermined limited degree of lateral movement of said elements between said terminal portions in said zone, and while passing a heat exchange medium through said elements, creating substantially continuous flow conditions in said fluid in said zone of sufficient velocity and extent to keep said elements in lateral motion sufficient to prevent deposition and build-up of said solid material on said tubular elements, said predetermined limited degree of lateral movement being such that engagement of said tubular elements between the terminal portions of each bundle with other structure of the apparatus is avoided.

References Cited

UNITED STATES PATENTS

| | | |
|---|---|---|
| 3,053,512 | 9/1962 | Soudan et al. _____ 165—84 |
| 1,884,555 | 10/1932 | Brown. |
| 2,664,274 | 12/1953 | Worn et al. |
| 3,228,456 | 1/1966 | Brown et al. |
| 2,433,546 | 12/1947 | Cornelius. |
| 3,227,630 | 1/1966 | Beckman. |

ROBERT A. O'LEARY, *Primary Examiner.*

CHARLES SUKALO, *Examiner.*